(12) United States Patent
Higuchi

(10) Patent No.: US 7,936,523 B2
(45) Date of Patent: May 3, 2011

(54) LENS DRIVE DEVICE

(75) Inventor: Daisuke Higuchi, Nagano (JP)

(73) Assignee: Nidec Sankyo Corporation (JP)

( * ) Notice: Subject to any disclaimer, the term of this patent is extended or adjusted under 35 U.S.C. 154(b) by 0 days.

(21) Appl. No.: 12/555,770

(22) Filed: Sep. 8, 2009

(65) Prior Publication Data

US 2010/0061000 A1    Mar. 11, 2010

(30) Foreign Application Priority Data

Sep. 8, 2008  (JP) ................................ 2008-229695

(51) Int. Cl.
*G02B 7/02*    (2006.01)
(52) U.S. Cl. ....................................... 359/814; 359/824
(58) Field of Classification Search ................... 359/814, 359/824
See application file for complete search history.

(56) References Cited

U.S. PATENT DOCUMENTS

2009/0015948 A1*  1/2009  Wada et al. ................... 359/824

FOREIGN PATENT DOCUMENTS

JP    2007-108598 A    4/2007

* cited by examiner

*Primary Examiner* — Jordan M. Schwartz
*Assistant Examiner* — James C Jones
(74) *Attorney, Agent, or Firm* — Cantor Colburn LLP

(57) ABSTRACT

A lens drive device may include a support body, a movable body having a lens, a magnetic drive mechanism for magnetically driving the movable body in a lens optical axis direction, and a spring member connected between the support body and the movable body. The magnetic drive mechanism includes a coil held by the movable body and both end parts of the coil are electrically connected to different spring pieces of the spring member through terminals. The support body includes an insulation member which holds the terminals, and each of the terminals includes an outside connecting terminal part which is located on an outer side of the insulation member, and a long elongated connecting part which is extended along an inner wall of the insulation member from the outside connecting terminal part and connected with the spring piece of the spring member.

21 Claims, 8 Drawing Sheets

Fig. 1(a)
Fig. 1(b)
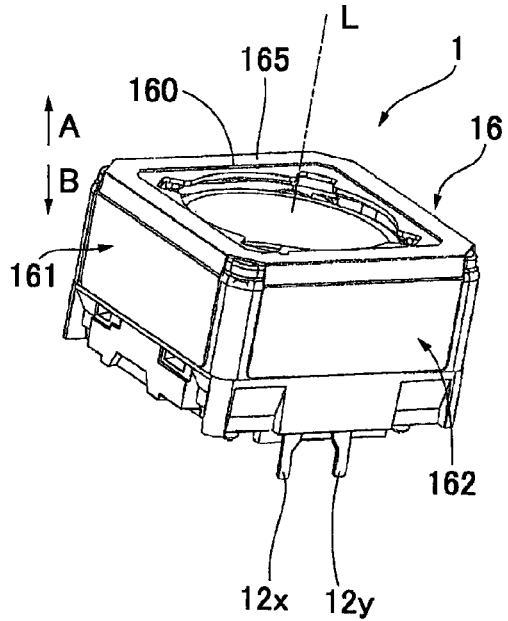
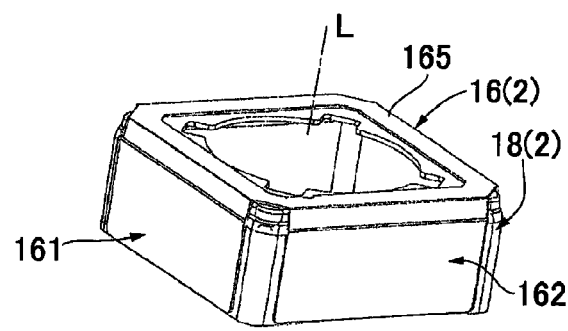
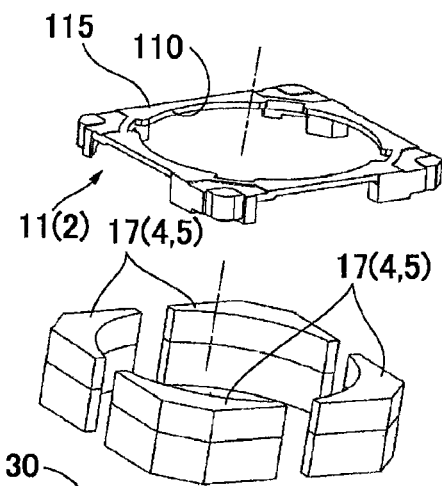
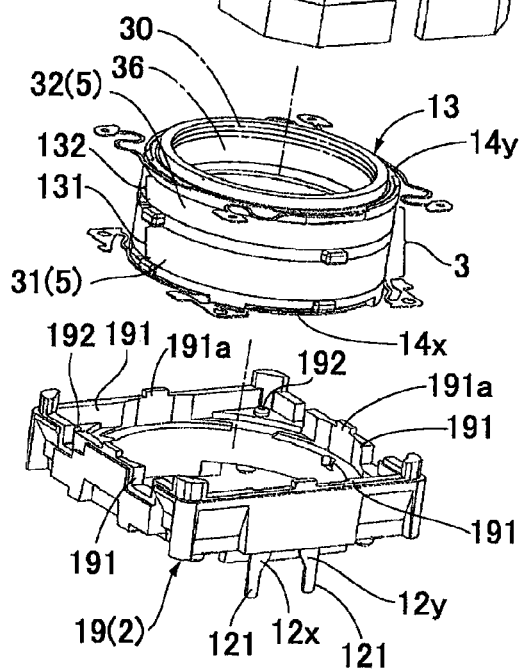

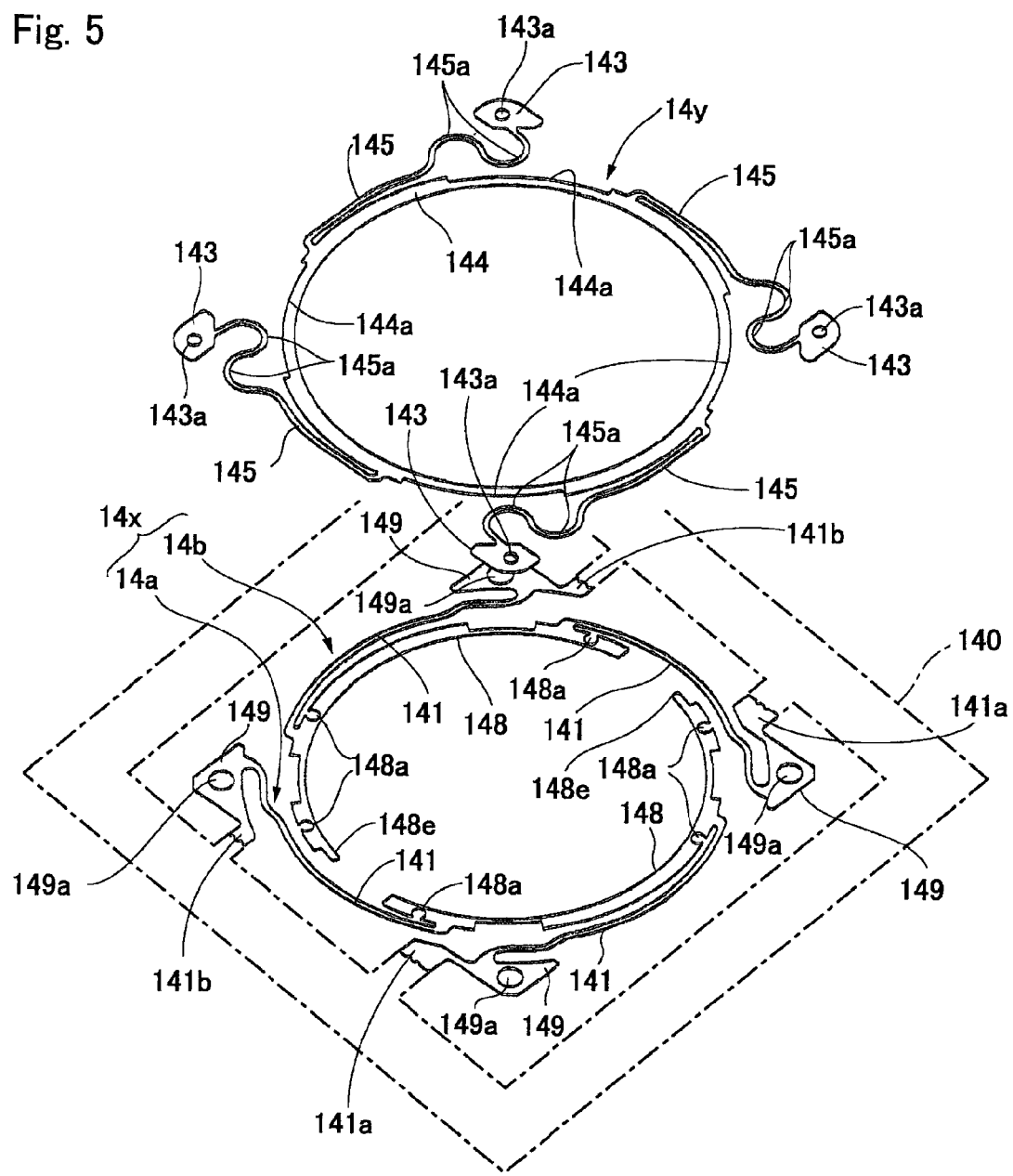

US 7,936,523 B2

LENS DRIVE DEVICE

CROSS REFERENCE TO RELATED APPLICATION

The present invention claims priority under 35 U.S.C. §119 to Japanese Application No. 2008-229695 filed Sep. 8, 2008, the entire contents of which are incorporated herein by reference.

FIELD OF THE INVENTION

At least an embodiment of the present invention may relate to a lens drive device in which a coil is held on a movable body having a lens.

BACKGROUND OF THE INVENTION

A lens drive device which is mounted on a cell phone with a camera or mounted on a digital camera may include a support body, a movable body having a lens, a magnetic drive mechanism for magnetically driving the movable body in an optical axis direction of the lens, and a spring member which is connected between the support body and the movable body. The movable body is driven in the optical axis direction by utilizing a thrust force of the magnetic drive mechanism and an urging force of the spring member. Therefore, in the lens drive device, an electric current is required to supply from outside to a coil held by the movable body through terminals.

In order to obtain this function, a structure has been proposed in which the spring member is divided into two spring pieces, which are electrically connected with both end parts of the coil, and end parts of the spring pieces are bent to be drawn outside of the support body as a terminal (see Japanese Patent Laid-Open No. 2007-108598).

However, in the structure that the end part of the spring piece is bent to be drawn outside of the support body as a terminal like the above-mentioned Patent Reference, when the end part of the spring piece is bent, the spring piece may be deformed to cause its spring constant to vary from a designed value and thus the movable body is not driven appropriately.

SUMMARY OF THE INVENTION

In view of the problems described above, at least an embodiment of the present invention may advantageously provide a lens drive device which is surely capable of preventing the spring member from being deformed due to a terminal for supplying electrical power to a coil.

According to at least an embodiment of the present invention, there may be provided a lens drive device including a support body, a movable body including a lens, a magnetic drive mechanism for magnetically driving the movable body in a lens optical axis direction, and a spring member which is connected between the support body and the movable body. The spring member includes a plurality of spring pieces which are electrically separated from each other, the magnetic drive mechanism includes a coil which is held by the movable body, both end parts of the coil are electrically connected to different spring pieces of a plurality of the spring pieces, the support body includes an insulation member which holds a plurality of terminals that are formed to be separated from the spring pieces. In addition, each of a plurality of the terminals includes an outside connecting terminal part which is located on an outer side of the insulation member, an inside connecting terminal part which is electrically connected with a connected part of the spring piece, and an elongated connecting part which is extended along an inner wall of the insulation member from the outside connecting terminal part to the inside connecting terminal part.

In accordance with at least an embodiment of the present invention, since the spring piece and the terminal are formed to be separated from each other, even when the terminal is formed with a bent portion in the process of manufacturing structuring lens drive device, the spring piece is not deformed caused by the bent portion of the terminal. Further, even when an external force is applied to the outside connecting terminal part, the terminal is provided with a long elongated connecting part and thus the external force is not transmitted to the spring portion of the spring piece. Therefore, the spring portion of the spring piece is surely prevented from being deformed by the external force. Accordingly, variation of the spring constant caused by deformation of the spring member is prevented and thus driving of the movable body by utilizing a thrust force of the magnetic drive mechanism and an urging force of the spring member is performed satisfactory. Moreover, the elongated connecting part is extended along the inner wall of the insulation member and thus, even when the elongated connecting part is made longer, the elongated connecting part does not come in contact with the spring piece.

In accordance with at least an embodiment of the present invention, the insulation member is formed with a through hole through which the outside connecting terminal part is penetrated from an inner side of the insulation member toward its outer side. According to this structure, since the outside connecting terminal part is drawn outside by utilizing a thick wall portion of the insulation member, the size of the lens drive device is reduced in comparison with a structure that the outside connecting terminal part is drawn outside along the outer face of the insulation member.

In accordance with at least an embodiment of the present invention, the outside connecting terminal part is press-fitted into the through hole. According to this structure, since the outside connecting terminal part of the terminal is firmly held by the insulation member, even when an external force is applied to the outside connecting terminal part, the external force is not transmitted to the spring piece. Therefore, deformation of the spring piece is prevented surely.

In accordance with at least an embodiment of the present invention, the insulation member is formed with a groove formed in a slit-like shape into which at least a part of the elongated connecting part is fitted. According to this structure, since the outside connecting terminal part of the terminal is firmly held by the insulation member, even when an external force is applied to the outside connecting terminal part, the external force is not transmitted to the spring piece. Therefore, deformation of the spring piece is prevented surely.

In accordance with at least an embodiment of the present invention, the insulation member is formed with a seat part for supporting the connected part of the spring piece. According to this structure, the spring piece and the inside connecting terminal part of the terminal are soldered with each other surely.

In accordance with at least an embodiment of the present invention, a plurality of the spring pieces is structured by means of that a plate-like member which is connected as one body through connecting parts is separated by cutting the connecting parts, and the connected part is one of a plurality of cut-off end parts of the spring piece which are formed when the connecting parts are cut off. According to this structure, the end part of the spring piece is connected to the terminal and thus soldering work is easily performed.

In accordance with at least an embodiment of the present invention, the connected part is a portion having a wider width dimension of a plurality of the cut-off end parts in comparison with other cut-off end part. According to this structure, the spring piece and the inside connecting terminal part of the terminal are soldered surely.

In accordance with at least an embodiment of the present invention, the connected part is disposed perpendicularly to the inside connecting terminal part and faces of the connected part and the inside connecting terminal part perpendicular to each other are soldered with each other. According to this structure, even when a region where soldering is occupied is set to be narrower on a plane, a sufficiently larger soldering area can be secured on both of the connected part and the inside connecting terminal part.

In accordance with at least an embodiment of the present invention, a gap space is formed between the connected part and the inside connecting terminal part in the optical axis direction and the gap space is filled with solder. According to this structure, a fillet in an appropriate shape can be formed on the soldered portion and the solder does not spread excessively.

Specifically, in accordance with at least an embodiment of the present invention, the support body includes a rectangular holder which is the insulation member on an image element side and a box-shaped yoke and a spacer on an object to be photographed side, the movable body includes a sleeve formed in a cylindrical shape, the spring member includes a first spring member which is connected between the holder and the sleeve and a second spring member which is connected between the spacer and the sleeve, the first spring member is divided into two spring pieces, and a winding start part and a winding end part of the coil are respectively connected to the two spring pieces. In this case, in order to provide the terminal with the long elongated connecting part, it is preferable that a through hole through which the outside connecting terminal part is penetrated is formed at a center portion in a circumferential direction of one side face part of the rectangular holder, and a cut-out part where the inside connecting terminal part is located and a seat part where the connected part of the spring piece is placed are formed on another side face part which is adjacent to the side face part where the through hole is formed.

In addition, it is preferable that the spring piece of the first spring member includes a support body side connecting part which is held by the holder, a movable body side connecting part which is fixed to the sleeve, and a flat spring-shaped arm part which connects the movable body side connecting part with the support body side connecting part, the support body side connecting part is fixed to the holder at a corner part of the holder, and the elongated connecting part of the terminal is drawn from the side face part where the through hole is formed to the adjacent side face part through the corner part of the holder where the support body side connecting part is fixed. In this case, the elongated connecting part is provided longer.

According to at least another embodiment of the present invention, there may be provided a lens drive device including a support body, a movable body including a lens, a magnetic drive mechanism for magnetically driving the movable body in a lens optical axis direction, and a spring member which is connected between the support body and the movable body. The spring member includes a plurality of spring pieces which are electrically separated from each other, the magnetic drive mechanism includes a coil which is held by the movable body, the support body includes an insulation member which holds a plurality of terminals that are electrically connected with both end parts of the coil. In addition, each of a plurality of the terminals includes an outside connecting terminal part which is located on an outer side of the insulation member and an elongated connecting part which is extended along an inner wall of the insulation member from the outside connecting terminal part, and the insulation member is formed with a through hole, through which the outside connecting terminal part is penetrated from inside of the insulation member toward its outside, and a groove formed in a slit-like shape into which at least a part of the elongated connecting part is fitted. In other words, in accordance with an embodiment of the present invention, regardless of that the terminal and the spring piece are structured of one piece of member or are structured of separated members from each other, the insulation member is formed with a through hole through which the outside connecting terminal part is penetrated from inside of the insulation member toward its outside and a groove formed in a slit-like shape into which at least a part of the elongated connecting part is fitted.

According to this structure, since the elongated connecting part is formed as the terminal so as to extend along the inner wall of the insulation member, the entire length of the terminal can be made longer. Therefore, even when the terminal and the spring piece are structure of one piece of member, in other words, even when a part of the spring piece is utilized as the terminal, a portion apart from the spring portion of the spring piece is bent to form the outside connecting terminal part as the terminal. Therefore, even when the spring piece is bent to form the outside connecting terminal part in the process of manufacturing structuring the lens drive device, the spring portion of the spring piece does not deform due to the outside connecting terminal part. Further, even when an external force is applied to the outside connecting terminal part, the external force is not transmitted to the spring portion of the spring piece because the elongated connecting part is made longer. Therefore, the spring portion of the spring piece is surely prevented from being deformed by the external force. Accordingly, variation of the spring constant caused by deformation of the spring member is prevented and thus driving of the movable body by utilizing a thrust force of the magnetic drive mechanism and an urging force of the spring member is performed satisfactory. Moreover, the elongated connecting part is extended along the inner wall of the insulation member and thus, even when the elongated connecting part is made longer, the elongated connecting part does not come in contact with the spring piece.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 1(a) is an outward appearance view showing a lens drive device in accordance with an embodiment of the present invention which is viewed from obliquely above, and FIG. 1(b) is its exploded perspective view.

FIG. 5 is a perspective view showing a spring member (first spring member and second spring member) which is used in a lens drive device in accordance with an embodiment of the present invention.

DETAILED DESCRIPTION OF THE PREFERRED EMBODIMENTS

An embodiment of the present invention will be described below with reference to the accompanying drawings. A lens drive device which will be described below is capable of being mounted on various electronic apparatuses in addition to a cell phone with a camera. For example, the lens drive device may be mounted on a thin-type digital camera, a PHS, a PDA, a bar code reader, a monitoring camera, a camera for rear confirmation in a car, a door having optical authentication function or the like or any other device.

Figure 2:
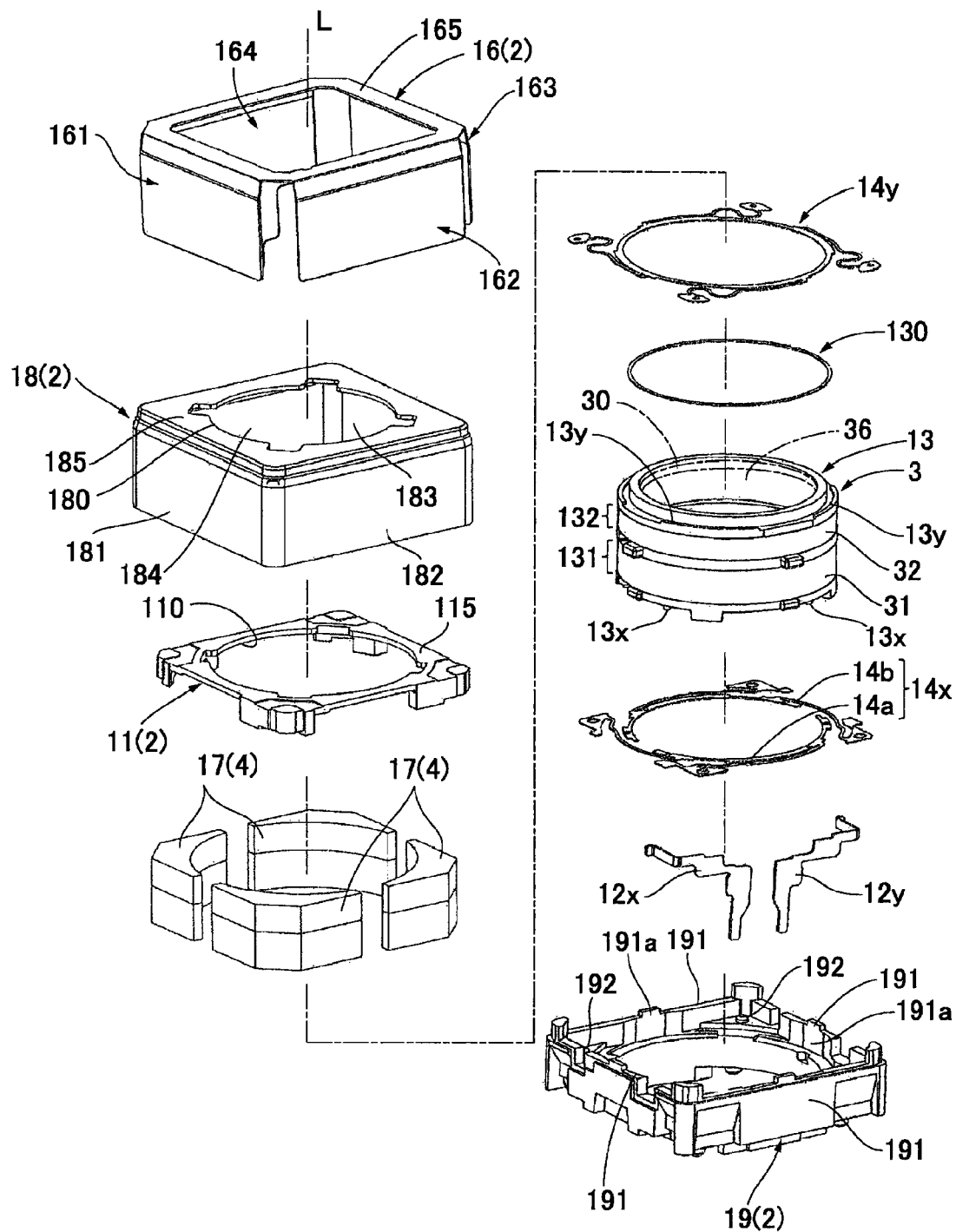
FIG. 2 is a detail exploded perspective view showing a lens drive device in accordance with an embodiment of the present invention.
Figure 3:
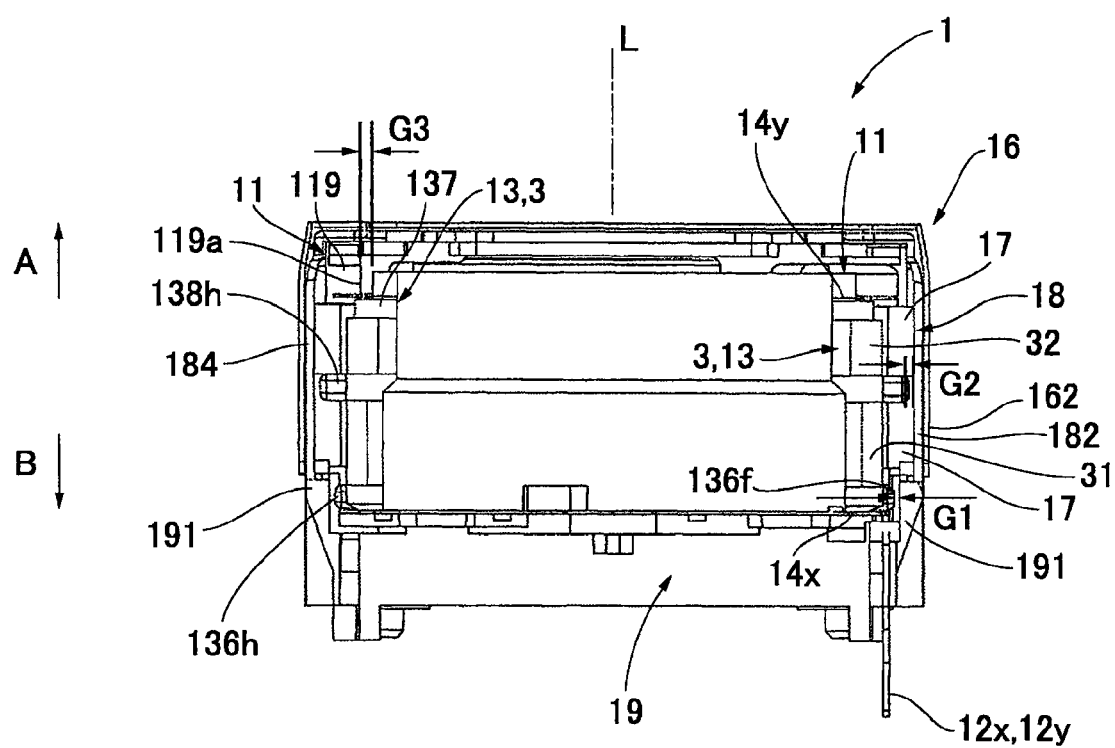
FIG. 3 is an explanatory view schematically showing an operation of a lens drive device in accordance with an embodiment of the present invention.

FIG. 1(a) is an outward appearance view showing a lens drive device in accordance with an embodiment of the present invention which is viewed from obliquely above, and FIG. 1(b) is its exploded perspective view. FIG. 2 is a detail exploded perspective view showing a lens drive device, which is separated in more detail than the state shown in FIG. 1(b), in accordance with an embodiment of the present invention. FIG. 3 is an explanatory view schematically showing an operation of a lens drive device in accordance with an embodiment of the present invention. In FIG. 3, a lens and a lens holder are not shown.

In FIGS. 1(a), 1(b), 2 and 3, a lens drive device 1 in this embodiment is, for example, structured in which a lens 36 and a diaphragm are moved along an optical axis direction "L" in both of an "A"-direction (front side) toward an object to be photographed (object side) and a "B"-direction (rear side) toward an opposite side (image side) to the object to be photographed in a thin camera which is used in a cell phone with a camera or the like. The lens drive device 1 is formed in a substantially rectangular parallelepiped shape. The lens drive device 1 includes a movable body 3, which is provided with a cylindrical lens holder 30 generally having one or plural pieces of lenses 36 and a fixed diaphragm in its inside, a magnetic drive mechanism 5 for moving the movable body 3 along the optical axis direction "L", and a support body 2 on which the magnetic drive mechanism 5, the movable body 3 and the like are mounted. The movable body 3 includes a sleeve 13 formed in a cylindrical shape, and a lens holder 30 formed in a cylindrical shape is fixed on its inside. Therefore, an outward shape of the movable body 3 is determined by the sleeve 13 and formed in a roughly circular cylindrical shape. The lens drive device 1 is a magnetic device which is provided with the magnetic drive mechanism 5.

In this embodiment, the movable body 3 includes three pieces of lens 36, which are disposed at both ends and a roughly center position in the optical axis direction of the movable body. A diameter of a lens disposed on an imaging element side is larger than diameters of other lenses. Therefore, a center of gravity of the movable body 3 is located on one side in the lens optical axis direction with respect to the center position of the movable body 3 and, in this embodiment, its center of gravity is located at a position shifted toward the imaging element side.

The support body 2 includes a holder 19 (insulation member) made of a rectangular resin plate for holding an imaging element (not shown) on an image side, and includes a cap 16, a box-shaped yoke 18 and a spacer 11 on an object to be photographed side. Center portions of the spacer 11, the cap 16 and the yoke 18 are respectively formed with circular incident windows 110, 160 and 180 for taking light from an object to be photographed into the lens 36. The yoke 18 is structured of a ferromagnetic plate such as a steel plate. As described below, together with a magnet 17, the yoke 18 structures an interlinkage magnetic field generating body 4 for generating an interlinkage magnetic field in a first coil 31 and a second coil 32 which are held by the sleeve 13.

The cap 16 is a metal press-worked product provided with a top plate part 165 and four side plate parts 161, 162, 163 and 164, which are bent toward the imaging element side from the top plate part 165. The side plate parts 161, 162, 163 and 164 are extended with a roughly same width dimension as side parts of the top plate part 165.

The magnetic drive mechanism 5 includes the first coil 31 and the second coil 32, which are wound around an outer peripheral face of the sleeve 13, and the interlinkage magnetic field generating body 4 for generating an interlinkage magnetic field in the first coil 31 and the second coil 32. The magnetic drive mechanism 5 is structured of the first coil 31, the second coil 32 and the interlinkage magnetic field generating body 4. The interlinkage magnetic field generating body 4 includes four magnets 17 which are faced with the first coil 31 and the second coil 32 on their outer peripheral sides. Further, the yoke 18 is also used as a structural component of the magnetic drive mechanism 5.

The yoke 18 is formed in a box-like shape provided with a top plate part 185, which covers an upper face side of the second coil 32 located on an object to be photographed side, and side plate parts 181, 182, 183 and 184 which cover side faces of the first coil 31 and the second coil 32. The yoke 18 reduces leakage flux from a magnetic path structured between the magnets 17 and the first coil 31 and the second coil 32. According to this structure, linearity between a moving amount of the movable body 3 and an electric current supplied to the first coil 31 and the second coil 32 can be improved.

In this embodiment, each of the four magnets 17 is formed in a roughly triangular prism shape and the four magnets 17 are fixed at four corner portions of the inner peripheral face of the yoke 18 in a separated state in the circumferential direction. Each of the four magnets 17 is divided into two pieces in the optical axis direction "L" and is magnetized so that its inside face and its outside face are magnetized to be different from each other. The four magnets 17 are, for example, magnetized so that inside faces of their upper half portions are magnetized to be an "N"-pole and their outside faces are magnetized to be an "S"-pole, and are magnetized so that inside faces of their lower half portions are magnetized to be an "S"-pole and their outside faces are magnetized to be an "N"-pole. Therefore, winding directions of a coil wire for the first coil 31 and the second coil 32 are opposite to each other. In a case that the magnet 17 is divided and disposed at four corners as described above, even when a space between the yoke 18 and the sleeve 13 becomes narrow at a center portion of a side part of the yoke 18, the magnet 17 is prevented from being provided with a very thin portion and thus the strength of the magnet 17 can be enhanced. Further, a magnetic force of the magnet 17 can be efficiently applied to the first coil 31 and the second coil 32 which are mounted on the movable body 3. In addition, since spaces at the four corners between the movable body 3 and the yoke 18 are efficiently utilized as an arrangement space of the magnet 17, the entire size of the lens drive device 1 can be reduced.

The lens drive device 1 in this embodiment includes a first spring member 14x and a second spring member 14y which are disposed between the holder 19 and the sleeve 13 (imaging element side) and between the spacer 11 and the sleeve 13 (object to be photographed side) so as to be connected with the support body 2 and the movable body 3. Each of the first spring member 14x and the second spring member 14y is made of metal such as beryllium copper or SUS steel material and is formed by means of that a thin plate having an appropriate thickness is performed by press working or etching processing using photo lithography technique.

Detailed structures of the first spring member 14x and the second spring member 14y will be described below. The first spring member 14x is connected with the holder 19 and the sleeve 13 and the movable body 3 is set to be in a supported state so as to be capable of moving along the optical axis of the lens. Further, the second spring member 14y is connected with the spacer 11 and the sleeve 13 and the movable body 3 is set to be in a supported state so as to be capable of moving along the optical axis of the lens.

The first spring member 14x which is disposed on the holder 19 side is divided into two pieces, i.e., two spring pieces 14a and 14b. As specifically described below, two end parts (winding start and winding end of one common wire) of the first coil 31 and the second coil 32 are connected with the spring pieces 14a and 14b. Therefore, the first spring member 14x (spring pieces 14a and 14b) functions also as a power supply member to the first coil 31 and the second coil 32.

The spring pieces 14a and 14b may be applied with bending work and drawn to outside of the support body 2 to be utilized to electrically connect with the outside as the terminals. However, in this embodiment, the terminals 12x and 12y separated from the spring pieces 14a and 14b and the yoke 18 are fixed to the holder 19.

In this embodiment, the magnetic drive mechanism 5 further includes a ring-shaped magnetic piece 130, which is held on the upper end of the sleeve 13. The magnetic piece 130 applies an urging force in the optical axis direction "L" to the movable body 3 by an attraction force acting between the magnets 17 and the magnetic piece 130. Therefore, the movable body 3 is prevented from displacing due to its own weight at the time of no energization and thus the movable body 3 is maintained in a desired posture and its impact resistance can be improved. Further, since the magnetic piece 130 acts as a back yoke, leakage flux from the magnetic path structured between the magnets 17 and the first coil 31 and the second coil 32 is reduced. In accordance with an embodiment of the present invention, a magnetic member in a bar-like shape may be used as the magnetic piece 130.

The spacer 11 is attached to an inside face of the top plate part 185 of the yoke 18 and an incident window 110 is formed at its center portion. Four corners of the plate part 115 are formed with a small projection 112 (see FIG. 6) which is protruded toward an opposite side to the object to be photographed side.

Four corners of the holder 19 are formed with a small projection 192 extending toward the object to be photographed side. The small projections 192 of the holder 19 and the small projections 112 of the spacer 11 are respectively used when the first spring member 14x and the second spring member 14y are connected and fixed to the support body 2.

An upper end face of the sleeve 13 (end face on the object to be photographed side) is formed with a plurality of step-shaped protruded parts 13y for connecting with the second spring member 14y in the circumferential direction. A lower end face of the sleeve 13 (end face on the imaging element side) is formed with a plurality of small projections 13x for connecting with the first spring member 14x in the circumferential direction.

In the lens drive device 1 in this embodiment, the movable body 3 is normally located on the imaging element side (image side). In this state, when an electric current is supplied to the first coil 31 and the second coil 32 in a predetermined direction, an upward (front side) electromagnetic force is applied to the first coil 31 and the second coil 32 respectively. Therefore, the sleeve 13 to which the first coil 31 and the second coil 32 are fixed begins to move toward the object side (front side/direction shown by the arrow "A"). In this case, elastic forces which restrict movement of the sleeve 13 are respectively occurred between the second spring member 14y and the front end of the sleeve 13 and between the first spring member 14x and the rear end of the sleeve 13. Therefore, the sleeve 13 stops when the electro-magnetic force moving the sleeve 13 toward the front side and the elastic force restricting the movement of the sleeve 13 are balanced with each other. In this case, when an amount of the electric current supplied to the first coil 31 and the second coil 32 is adjusted according to the elastic force acting on the sleeve 13 by the first spring member 14x and the second spring member 14y, the sleeve 13 (movable body 3) can be stopped at a desired position.

In this embodiment, a flat spring (gimbal spring), which is provided with a linear relationship between an elastic force (stress) and a displacement amount (distortion amount), is used as the first spring member 14x and the second spring member 14y. Therefore, linearity between a moving amount of the sleeve 13 and an electric current supplied to the first coil 31 and the second coil 32 can be improved. Further, two spring members comprised of the first spring member 14x and the second spring member 14y are used and thus, when the sleeve 13 is stopped, large balanced forces are applied in the optical axis direction. Therefore, even when a centrifugal force, an impact force or the like is acted in the optical axis direction, the sleeve 13 can be stopped further stably. In addition, in order to stop the sleeve 13 of the lens drive device 1, in this embodiment, instead of making the sleeve 13 collide with a collided member (buffer material), the sleeve 13 is stopped by utilizing the electromagnetic force and the elastic force and thus a collision noise is prevented.

Figure 4A:
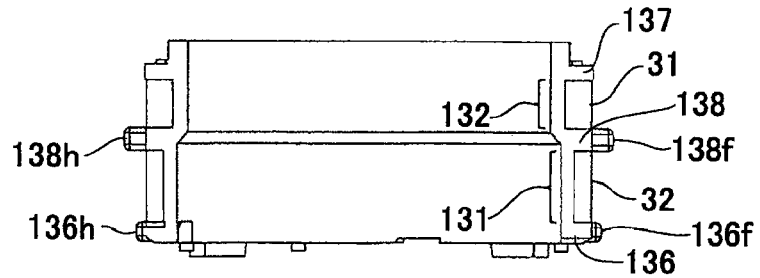
FIG. 4(a) is a sectional view showing a state where a first coil and a second coil are wound around a sleeve in a lens drive device in accordance with an embodiment of the present invention.
Figure 4B:
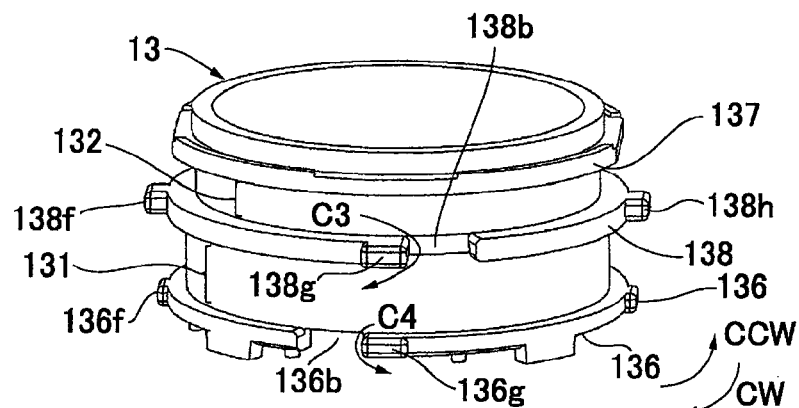
FIG. 4(b) is a perspective view showing the sleeve.
Figure 4C:
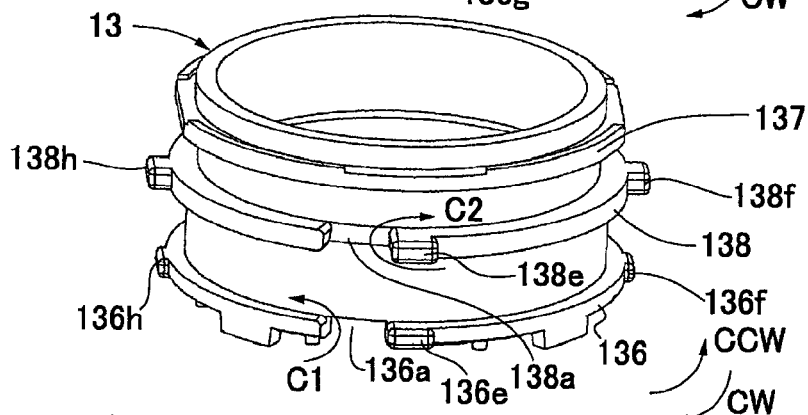
FIG. 4(c) is a perspective view showing the sleeve which is viewed from the opposite side.
Figure 4D:
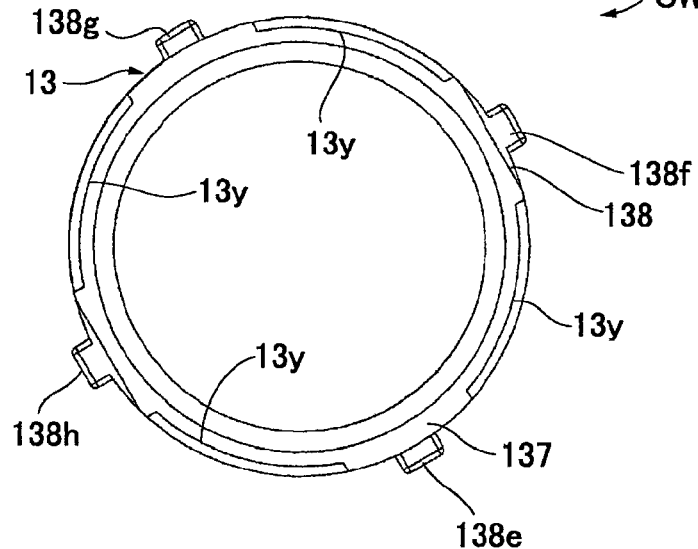
FIG. 4(d) is a plan view showing the sleeve.

FIG. 4(a) is a sectional view showing a state where the first coil 31 and the second coil 32 are wound around the sleeve 13 in the lens drive device 1 in accordance with an embodiment of the present invention, FIG. 4(b) is a perspective view showing the sleeve 13, FIG. 4(c) is a perspective view showing the sleeve 13 which is viewed from the opposite side, and FIG. 4(d) is a plan view showing the sleeve 13.

As described with reference to FIGS. 1(a) through 3, the sleeve 13 is a coil wound body in which the first coil 31 and the second coil 32 are wound around its outer peripheral face and winding directions of a coil wire of the first coil 31 and the second coil 32 are opposite to each other. In order to obtain this structure, in this embodiment, the outer peripheral face of the sleeve 13 is formed with rib-shaped protruded parts 136 and 137 formed in a ring shape at an imaging element side end part and an object side end part. Further, the outer peripheral face of the sleeve 13 is formed with a rib-shaped protruded part 138 formed in a ring shape at a position slightly shifted toward the object to be photographed side with respect to the middle position between the rib-shaped protruded parts 136 and 137. Therefore, a first coil winding face 131 is formed between the rib-shaped protruded parts 136 and 138 on the outer peripheral face of the sleeve 13, and a second coil winding face 132 is formed between the rib-shaped protruded parts 137 and 138. A width dimension in the optical axis direction "L" (distance between the rib-shaped protruded parts) of the second coil winding face 132 is narrower than that of the first coil winding face 131, and its outer diameter dimension is smaller than that of the first coil winding face 131.

The rib-shaped protruded part 137 which is formed at the object side end part is continuously formed in the circumferential direction. On the other hand, the rib-shaped protruded part 136 on the imaging element side is formed with a pair of cut-out portions at positions opposite to each other across the optical axis. One of a pair of the cut-out portions is utilized as a coil winding start part 136a and the other cut-out portion is utilized as a coil winding end part 136b. The rib-shaped protruded part 136 is formed with projections 136e, 136f, 136g and 136h protruded toward outer peripheral side with equal angular distances, and the projections 136e and 136g are respectively formed to be adjacent to the coil winding start part 136a and the coil winding end part 136b on the counter-clockwise CCW side.

The rib-shaped protruded part 138 disposed at the middle position is formed with a pair of cut-out portions at positions opposite to each other across the optical axis. A pair of the cut-out portions is utilized so that a winding position of a coil wire is changed between the first coil winding face 131 and the second coil winding face 132 and is utilized also as coil turning parts 138a and 138b for reversing a winding direction of the coil wire. The rib-shaped protruded part 138 is formed with projections 138e, 138f, 138g and 138h which are protruded toward outer peripheral side with equal angular distances. The projection 138e is adjacent to the coil turning part 138a on the counter-clockwise CCW direction side and the projection 138g is adjacent to the coil turning part 138b on the clockwise CW direction side. The projections 138e and 138g function as a coil engaging part with which the coil wire is engaged together with the end part of the rib-shaped protruded part 138 when the winding direction of the coil wire is reversed through the turning parts 138a and 138b. The coil engaging part may be formed as a projection which is protruded outside in the radial direction from the outer peripheral face of the sleeve 13. For example, when the projections 138e and 138g are not formed, a cut-out portion is formed in the rib-shaped protruded part 138 for separating the first coil winding face 131 and the second coil winding face 132 from each other, an end part of the rib-shaped protruded part 138 which is formed by the cut-out portion may be utilized as the coil engaging part.

The projections 138e, 138f, 138g and 138h which are formed at the middle position on the sleeve 13 structured as described above are protruded on an outer side in the radial direction in comparison with the projections 136e, 136f, 136g and 136h formed on the imaging element side. As described below, the projections 138e through 138h are located between the magnets 17 which are disposed to be adjacent in the circumferential direction. Further, the projections 136e through 136h formed on the outer peripheral face of the sleeve 13 are located on inner sides of the recessed parts 191a which are formed on an inner face of the side wall part 191 of the holder 19. Therefore, the projections 138e, 138f, 138g and 138h disposed at the middle position and the projections 136e, 136f, 136g and 136h disposed on the imaging element side function also as an interference projecting part for restricting a turning range of the movable body 3 or for restricting a moving range in the radial direction of the movable body 3.

In the sleeve 13 in this embodiment, an outer diameter dimension of the first coil winding face 131 is different from that of the second coil winding face 132, and the outer diameter dimension of the second coil winding face 132 is smaller than the outer diameter dimension of the first coil winding face 131. In other words, according to increase of pixel number, a plurality of lenses 36 is held on the inside of the sleeve 13 through the lens holder 30 and a lens located on the imaging element side is set to be larger than that located on the object to be photographed side. Therefore, the outer diameter dimension of the lens holder 30 is set to be smaller on the object to be photographed side than that on the imaging element side and thus an inner diameter dimension of the sleeve 13 is set to be smaller on the object to be photographed side than that on the imaging element side. Accordingly, an outer diameter dimension of the second coil winding face 132 is set to be smaller than that of the first coil winding face 131.

In order to wind a coil wire around the sleeve 13, in this embodiment, first, as shown by the arrow C1, the coil wire is wound around the first coil winding face 131 from the winding start part 136a in a clockwise direction CW by an odd number of layers. As a result, an end of the coil wire is located near the coil turning part 138a and thus, as shown by the arrow C2, a winding direction of the coil wire is reversed through a root portion of the projection 138e when the coil wire is passed through the coil turning part 138a. After that, the coil wire is wound around the second coil winding face 132 by an even number of layers in the counter-clockwise direction CCW. In this case, the coil wire is reciprocated along the coil winding face 132 and thus an end of the coil wire reaches near the rib-shaped protruded part 138 disposed at the middle position. Next, as shown by the arrow C3, a winding direction of the coil wire is reversed through a root portion of the projection 138g when the coil wire is passed through the coil turning part 138b. After that, the coil wire is wound around the first coil winding face 131 by an odd number of layers in the clockwise direction CW. As a result, an end of the coil wire reaches near the rib-shaped protruded part 136 and thus, as shown by the arrow C4, the coil wire is drawn out from the coil winding end part 136b. The winding start part and the winding end part of the coil wire are connected with the spring pieces 14a and 14b of the first spring member 14x which are described with reference to FIGS. 1(a) and 1(b) and FIG. 2.

In this embodiment, the coil wire is regularly wound around the first coil winding face 131 and the second coil winding face 132. Further, each of the numbers of layers of coil winding around the first coil winding face 131 and the second coil winding face 132 is eight or less, and a wire diameter of the coil wire is in a range of 0.04-0.08 mm including insulation layer.

Further, in this embodiment, the outer diameter dimension of the first coil winding face 131 is different from that of the second coil winding face 132, and the number of layers of coil winding around the winding face having a smaller outer diameter dimension is set to be larger than the winding face having a lager outer diameter dimension. In other words, in this embodiment, the number of layers of coil winding around the second coil winding face 132 having a smaller outer diameter dimension is set to be larger than that of the first coil winding face 131 having a larger outer diameter dimension. Especially in this embodiment, in the second coil winding face 132 having a smaller outer diameter dimension, the number of layers of coil winding is increased so as to correspond to a difference of the outer diameter dimension in comparison with the first coil winding face 131 having a larger outer diameter dimension. Therefore, the outer diameter dimension of the sleeve including the coil wire is set so that a portion corresponding to the first coil winding face 131 and a portion corresponding to the second coil winding face 132 are equal to each other. Accordingly, the number of layers of the coil wire can be increased without increasing the maximum outer diameter dimension of the entire sleeve 13 including the first coil 31 and the second coil 32.

As described above, in this embodiment, the winding order and the number of wound layers of the coil wire are optimized in the first coil winding face and the second coil winding face and thus a jumper wire crossing the first coil winding face 131 or the second coil winding face 132 is not formed. Therefore, an amount of the outer diameter occupied by the conventional jumper wire is utilized as a coil winding space and thus the number of wound layers of the coil wire can be increased without increasing its outer diameter dimension. Further, since the coil wire is wound around regularly, the winding number of the coil wire can be increased without increasing its outer diameter dimension.

Especially in this embodiment, each of the numbers of layers of coil winding around the first coil winding face 131 and the second coil winding face 132 is eight or less, i.e., the number is small. Therefore, when there is no jumper wire, the number of wound layers of the coil wire can be increased by one layer, in other words, the number of wound layers can be increased 10% or more. Further, in this embodiment, since the wire diameter of the coil wire is very thin, i.e., in a range of 0.04-0.08 mm including insulation layer, when a jumper wire is provided, the coil wire may be easily disconnected. However, according to this embodiment, since there is no jumper wire, disconnection of the coil wire caused by the jumper wire does not occur during the coil wire is being wound around.

Further, the coil winding start part 136a and the coil winding end part 136b are located on opposite sides to each other. Therefore, in comparison with a case that the coil winding start part 136a and the coil winding end part 136b are adjacent to each other in the circumferential direction, symmetric property of the movable body 3 can be secured. Accordingly, the movable body 3 can be moved in the optical axis direction "L" in a stable posture without being inclined.

With reference to FIG. 5, a structure of the spring member (first spring member 14x and second spring member 14y) will be described which is used in the lens drive device 1 to which the present invention is applied. FIG. 5 is a perspective view showing the first spring member 14x and the second spring member 14y which are used in the lens drive device 1 in accordance with an embodiment of the present invention.

In this embodiment, a spring force of the spring member is utilized. Therefore, the first spring member 14x and the second spring member 14y are required so that a longitudinal spring constant is constant in a wide deformation range in the lens optical axis direction "L", in other words, when the sleeve 13 is moved in the optical axis direction "L", spring forces generated in the first spring member 14x and the second spring member 14y are required to be constant. In addition, their lateral spring constants are required to be larger, in other words, when the movable body 3 is moved in the optical axis direction "L", the movable body 3 is not displaced in the direction perpendicular to the optical axis. However, it is difficult that both of the requirements are satisfied by using one kind of spring member. Therefore, in this embodiment, a following structure described below is utilized.

As shown in FIG. 5, the first spring member 14x on the imaging element side is provided with four support body side connecting parts 149, which are held by the support body 2 (holder 19), ring-shaped movable body side connecting parts 148, which are fixed to the movable body 3 (sleeve 13), and four flat spring-shaped arm parts 141 which connect the support body side connecting parts 149 with the movable body side connecting parts 148. The movable body side connecting part 148 is formed with a small opening 148a for connecting with a lower end part of the sleeve 13, and the support body side connecting part 149 is formed with a small opening 149a for connecting with the holder 19 at the corner portion of the holder 19 which is formed in a rectangular shape. In this embodiment, the arm part 141 is extended in a circular arc shape in the circumferential direction and is not provided with a meandering portion which is radially folded back.

The first spring member 14x is divided into two spring pieces 14a and 14b, which are utilized as a power supply member to the first coil 31 and the second coil 32. Therefore, both end parts (winding start part and winding end part) of one coil wire which structures the first coil 31 and the second coil 32 are connected with end parts 148e of the movable body side connecting parts 148 of two spring pieces 14a and 14b by a method such as soldering.

In this embodiment, the first spring member 14x is formed so that the spring pieces 14a and 14b are connected with each other through a frame part 140 as shown by the alternate long and short dash line until the halfway of manufacturing and, at the time of assembling to the lens drive device 1, the first spring member 14x is cut and divided into two spring pieces 14a and 14b. Therefore, the spring pieces 14a and 14b are provided with cutting portions 141a and 141b from the frame part 140, and a width of the cut-off portion 141a is wider than that of the cutting portion 141b. The cut-off portions 141a having a wider width are utilized as a connected part with the terminals 12x and 12y by soldering as described below.

The second spring member 14y on the object to be photographed side is provided with four support body side connecting parts 143, which is held by the support body 2 (spacer 11), a movable body side connecting part 144, which is formed in a circular ring and frame shape and is connected with an upper end of the sleeve 13, and four arm parts 145 which connect the support body side connecting parts 143 with the movable body side connecting part 144. These four arm parts 145 are respectively extended from connected portions with the movable body side connecting part 144 to the support body side connecting parts 143 through a curved meandering part 145a which is folded back while circularly curving on an outer peripheral side. In this embodiment, the movable body side connecting part 144 is formed with cut-out parts 144a for connecting with the upper end part of the sleeve 13, and the support body side connecting part 143 is formed with a small opening 143a for connecting with the spacer 11.

As described above, in this embodiment, two spring members (first spring member 14x and second spring member 14y) are used. Therefore, the two spring members are structured in a different manner from each other to cope with the requirements to the spring member. In other words, in this embodiment, a first type of spring member is used as the first spring member 14x which is provided with the arm part 141 extended in a circular arc shape in the circumferential direction without a meandering part. The first type of spring member is difficult to extend the arm part 141 further longer in order to set its longitudinal spring constant to be constant over a wide deformation range in the optical axis direction "L" but its lateral spring constant becomes larger. On the other hand, a second type of spring member is used as the second spring member 14y, in which the arm part 145 having the circularly meandering part 145a extended on the outer side is extended in the circumferential direction. The second type of spring member is provided with a small lateral spring constant but, since the arm part 145 is provided with the circularly meandering part 145a extended on the outer side, its longitudinal spring constant becomes constant over a wide deformation range in the lens optical axis direction "L". Therefore, according to this embodiment, both of the requirement to a large lateral spring constant and the requirement where a longitudinal spring constant is maintained to be constant over a wide range in the lens optical axis direction "L", which are not satisfied by one kind of spring member, can be satisfied. Accordingly, since the lateral spring constant having a sufficient level is realized, the movable body 3 is prevented from displacing in side directions, and the longitudinal spring constant can be maintained to be constant over a wide moving range in the optical axis direction "L".

Further, in this embodiment, a first type of spring member having a large lateral spring constant is used as the first spring member 14x which is disposed on the imaging element side. Therefore, even when an external force in a direction perpendicular to the optical axis direction "L" is applied to the movable body 3, deterioration of image quality can be prevented. In other words, in the small lens drive device 1, when a shake on the imaging element side of the movable body 3 in the direction perpendicular to the optical axis is compared with a shake in the same direction on the object to be photographed side, the shake on the imaging element side affects larger to the image quality than that on the object side. According to this embodiment, the lateral spring constant of the first spring member 14x, which is disposed on the imaging element side and is provided with larger effect to the image quality, is set to be larger and thus effect to the image quality can be restrained smaller.

In this embodiment, the first spring member 14x and the second spring member 14y are formed in a substantially rotational symmetrical arrangement so that four arm parts are extended in the same circumferential direction. However, it may be structured that two of the four arm parts are formed in a linear symmetrical arrangement.

Figure 6A:
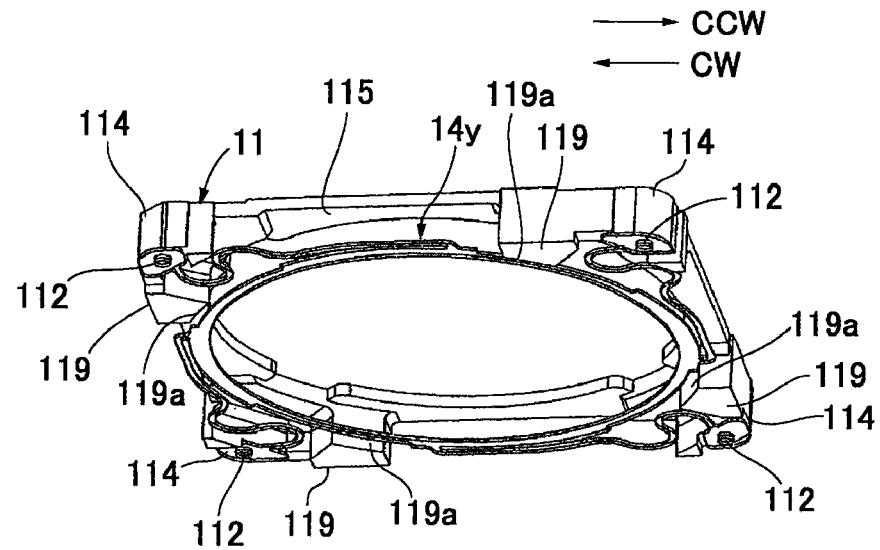
FIG. 6(a) is a perspective view showing a spacer used in a lens drive device in accordance with an embodiment of the present invention which is viewed from obliquely below.
Figure 6B:
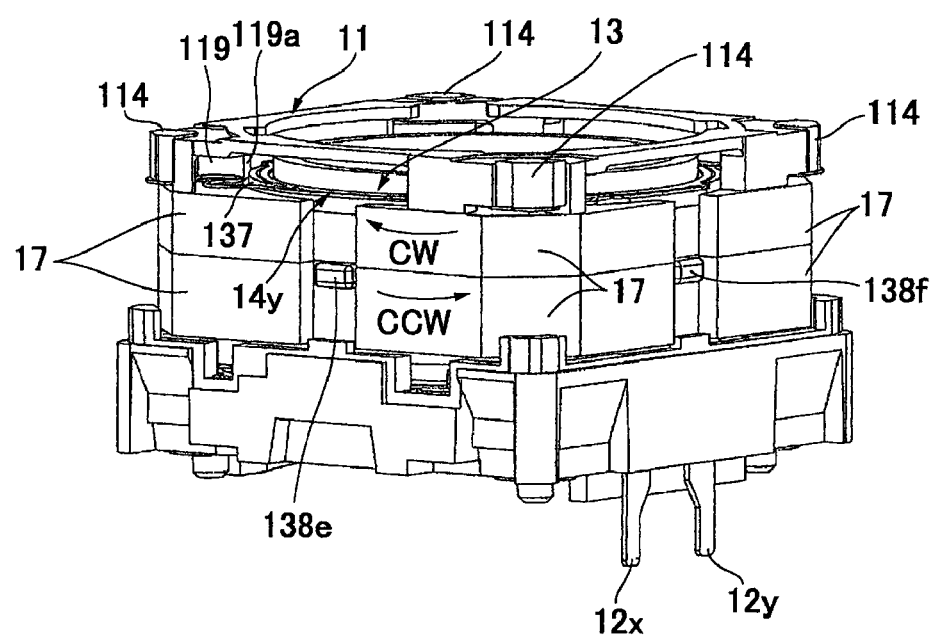
FIG. 6(b) is an explanatory view showing a positional relationship between the spacer and the sleeve.

FIG. 6(a) is a perspective view showing the spacer 11 used in the lens drive device 1 in accordance with an embodiment of the present invention which is viewed from obliquely below, and FIG. 6(b) is an explanatory view showing a positional relationship between the spacer 11 and the sleeve 13.

In this embodiment, a first type of spring member having a larger lateral spring constant is used as the first spring member 14x which is disposed on the imaging element side, and a second type of spring member having a smaller lateral spring constant is used as the second spring member 14y on the object to be photographed side. Therefore, the movable body 3 may be largely shaken in the radial direction on the object to be photographed side. Accordingly, in this embodiment, as described below, a clearance between the support body 2 and the movable body 3 in the radial direction is set to be larger on the object to be photographed side in comparison with the imaging element side.

In other words, a clearance "G1" (see FIG. 3) between the support body 2 and the movable body 3 on the imaging element side is determined by a gap space dimension in the radial direction between the projections 136e, 136f, 136g and 136h of the sleeve 13 shown in FIG. 3 and FIGS. 4(a) through 4(d) and an inner face of the side wall 191 of the holder 19. Further, a clearance "G2" (see FIG. 3) between the support body 2 and the movable body 3 in the intermediate portion between the imaging element side and the object to be photographed side is determined by a gap space dimension in the radial direction between the projections 138e, 138f, 138g and 138h of the sleeve 13 shown in FIG. 3 and FIGS. 4(a) through 4(d) and the inner faces of the side plate parts 181, 182, 183 and 184 of the yoke 18.

A clearance "G3" (see FIG. 3) between the support body 2 and the movable body 3 on the object to be photographed side is determined by a gap space dimension in the radial direction between the sleeve 13 and column-shaped protruded parts 119 of the spacer 11 protruded toward the imaging element side.

The structure of the clearance "G3" will be described in detail below with reference to FIGS. 6(a) and 6(b). As shown in FIGS. 6(a) and 6(b), an under face part of the spacer 11 is formed on four corners with small projections 112 on the spring member fixing part 114 having a larger wall thickness. The small projections 112 are fitted into small openings 143a formed in the support body side connecting parts 143 of the second spring member 14y. The under face part of the spacer 11 is formed with the column-shaped protruded parts 119 protruded toward the imaging element side at positions in the clockwise direction CW near the spring member fixing parts 114 where the small projections 112 are formed. A lower end face of the column-shaped protruded part 119 is abutted with an end face of the magnet 17 on the object to be photographed side to position the magnet 17 between the holder 19 and the column-shaped protruded part 119.

In this embodiment, an inner side face 119a of the column-shaped protruded part 119 is formed in a curved face when viewed from the optical axis direction "L". On the other hand, an outer peripheral face of the rib-shaped protruded part 137 of the sleeve 13 formed in a ring shape faces the inner side face 119a of the column-shaped protruded part 119 on an inner side over a predetermined gap space in the radial direction. The clearance "G3" on the object to be photographed side between the support body 2 and the movable body 3 is determined by the gap space. Therefore, the column-shaped protruded part 119 functions as a moving restricting part for restricting movement in the radial direction of the movable body 3. As described above, in this embodiment, the spring member fixing part 114 for fixing the second spring member 14y and the column-shaped protruded part 119 for restricting movement in the radial direction of the movable body 3 are disposed closely in the spacer 11.

The clearances "G1", "G2" and "G3" are set to be the following relationship:

$$G1 \leq G2 < G3.$$

The clearance in the radial direction between the support body 2 and the movable body 3 is set to be larger on the object to be photographed side than that on the imaging element side. Therefore, even when the object to be photographed side of the movable body 3 is shaken in the direction perpendicular to the optical axis, an unnecessary interference is not occurred between the movable body 3 and the support body 2.

Further, in this embodiment, the clearances "G1", "G2" and "G3" are set in dimensions so that, when the movable body 3 is moved with respect to the support body 2, the first spring member 14x and the second spring member 14y do not contact with the magnets 17 and the movable body 3. Therefore, even when the movable body 3 is shaken in the direction perpendicular to the optical axis, the first spring member 14x and the second spring member 14y are not interfered with the magnets 17, the support body 2 and the movable body 3. Therefore, damage such as plastic deformation of the first spring member 14x and the second spring member 14y can be prevented surely.

Further, the column-shaped protruded part 119 is protruded toward the imaging element side from the under face of the spacer 11 to provide a function positioning the magnets 17 between the holder 19 and the column-shaped protruded part 119. In addition, the column-shaped protruded part 119 is provided with a sufficient protruding dimension toward the imaging element side from the under face of the spacer 11. In other words, when the movable body 3 is located at the nearest position to the imaging element, the outer peripheral face of the rib-shaped protruded part 137 of the sleeve 13 faces the lower end part of the inner side face 119a of the column-shaped protruded part 119. Therefore, even when the movable body 3 is moved to any position in the optical axis direction "L", the outer peripheral face of the rib-shaped protruded part 137 of the sleeve 13 faces the inner side face 119a of the column-shaped protruded part 119. Accordingly, even when the movable body 3 is moved to any position in the optical axis direction "L", movement in the radial direction of the movable body 3 is restricted by the spacer 11. In addition, the spring member fixing part 114 and the column-shaped protruded part 119 of the spacer 11 are closely disposed each other and thus the second spring member 14y always provide a desired spring characteristic. In other words, in order to make the second spring member 14y provide a desired spring characteristic, it is important that deformation is prevented at a portion near the connecting portion of the second spring member 14y with the support body 2 (spacer 11). According to this embodiment, since the spring member fixing part 114 and the column-shaped protruded part 119 are disposed in the vicinity to each other and thus deformation is surely prevented at a portion near the connecting portion of the second spring member 14y with the support body 2 (spacer 11). Especially, in this embodiment, the portion near the connecting portion of the second spring member 14y with the support body 2 (spacer 11) is formed with the S-shaped meandering part 145a and the magnet 17 is disposed its vicinity. However, the spring member fixing part 114 and the column-shaped protruded part 119 are disposed in the vicinity to each other and thus, even when the movable body 3 is displaced in the radial direction, abutting of the meandering part 145a of the second spring member 14y and the magnet 17 can be prevented surely.

Further, in this embodiment, the projections 138e through 138h which are formed on the outer peripheral face of the sleeve 13 are located between four magnets 17 disposed in the circumferential direction. Further, the projections 136e through 136h which are formed on the outer peripheral face of the sleeve 13 are located on the inner sides of the recessed parts 191a which are formed on the inner face of the side wall parts 191 of the holder 19. Therefore, when the movable body 3 is displaced due to impact or the like in the direction perpendicular to the optical axis direction "L" (radial direction or circumferential direction), the projections 138e through 138h are abutted with the magnets 17 to function also as a projecting part for interference which perform a rotation range restriction and a moving restriction in the radial direction of the movable body 3. Further, when the movable body 3 is displaced due to impact or the like in the direction perpendicular to the optical axis direction "L" (radial direction), the projections 136e through 136h are abutted with the side wall part 191 of the holder 19 to function also as a projecting part for interference which perform a moving restriction in the radial direction of the movable body 3. Moreover, even when the movable body 3 is moved to any position in the optical axis direction "L", the projecting parts for interference comprised of the projections 136e through 136h and 138e through 138h are abutted with the side wall part 191 of the holder 19 and the magnets 17 when the movable body 3 is displaced in direction perpendicular to the optical axis direction "L" due to an impact or the like. Accordingly, even when the movable body 3 is moved to any position in the optical axis direction "L", displacement in the radial direction of the movable body 3 is prevented surely.

Figure 7:
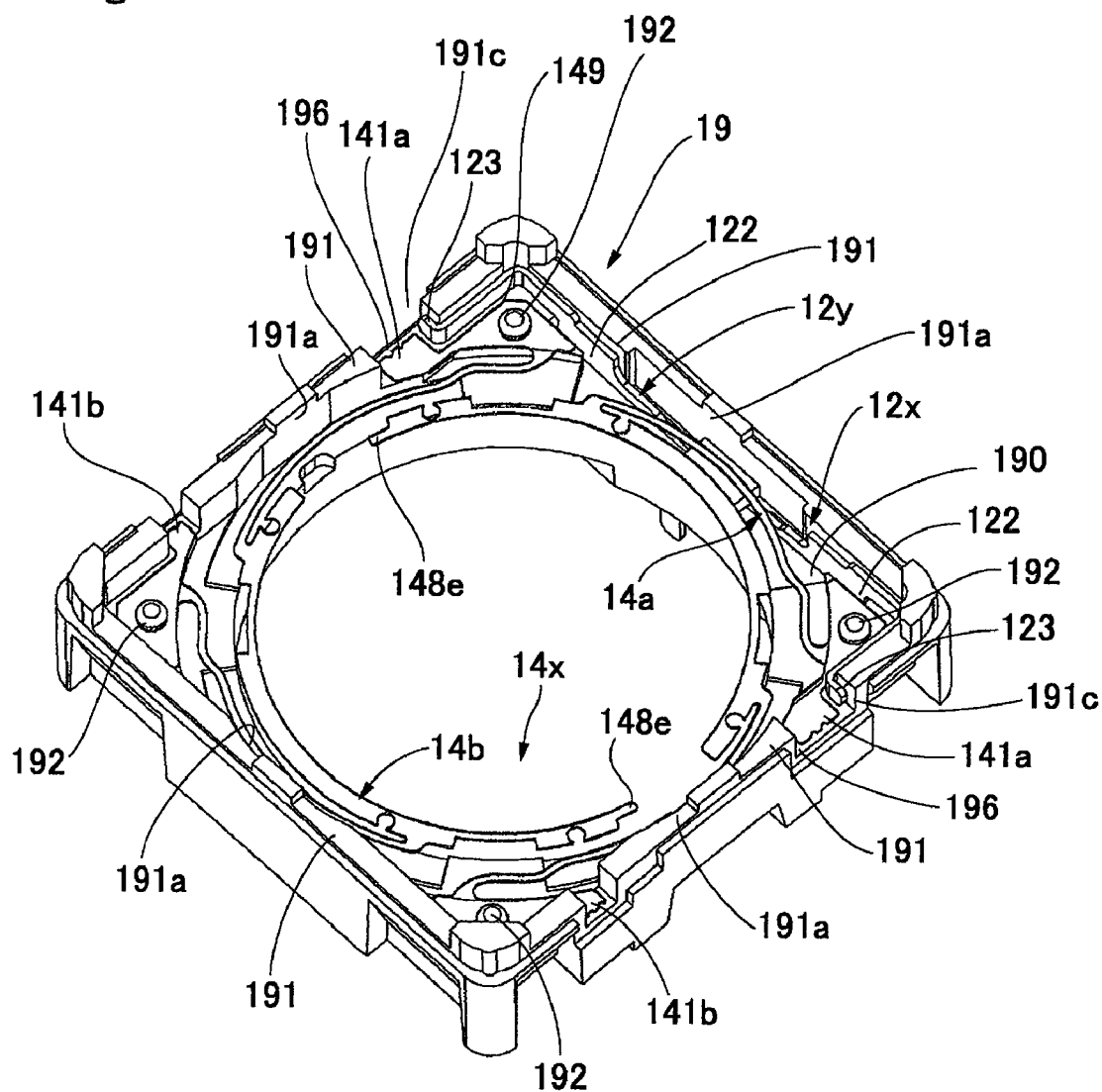
FIG. 7 is a perspective view showing a state where terminals and a first spring member are mounted on a holder in a lens drive device in accordance with an embodiment of the present invention.
Figure 8:
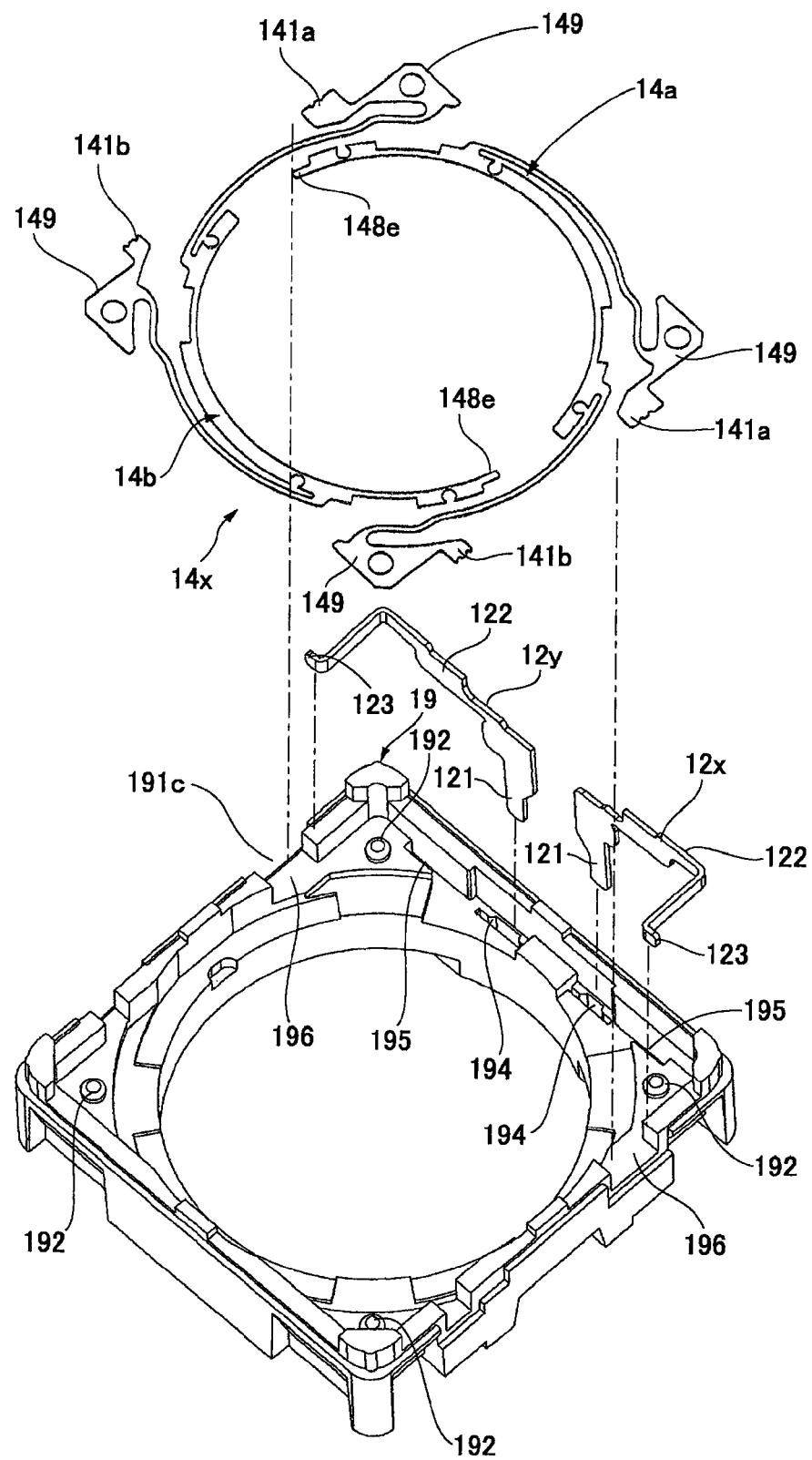
FIG. 8 is a perspective view showing a state where a holder, terminals and a first spring member are separated from each other in a lens drive device in accordance with an embodiment of the present invention.

FIG. 7 is a perspective view showing a state where terminals 12x and 12y and the first spring member 14x are mounted on the holder 19 in the lens drive device 1 in accordance with an embodiment of the present invention. FIG. 8 is a perspective view showing a state where the holder 19, terminals 12x and 12y and the first spring member 14x are separated from each other in the lens drive device 1 in accordance with an embodiment of the present invention.

In this embodiment, in order to supply an electric current to the first coil 31 and the second coil 32, both end parts of the coil wire (winding start part and winding end part) are connected with the end parts 148e of the spring pieces 14a and 14b shown in FIGS. 7 and 8 by a method such as soldering and terminals 12x and 12y formed separately from the spring pieces 14a and 14b are used.

The terminals 12x and 12y are provided with an outside connecting terminal part 121, which is located on an outer side of the holder 19 (insulation member), an inside connecting terminal part 123, which is electrically connected with the cut-off portions 141a (connected part) of the spring pieces 14a and 14b, and an elongated connecting part 122 which is extended from the outside connecting terminal part 121 along the side wall part 191 (inner wall) of the holder 19 to the inside connecting terminal part 123. The outside connecting terminal parts 121 are portions of the terminals 12x and 12y which are extended downward from one end part of the elongated connecting parts 122 at a center portion in the circumferential direction of one side face part of the rectangular holder 19. The inside connecting terminal parts 123 are tip end parts of the elongated connecting parts 122 which are extended along the side wall part 191 of the holder 19 and bent at two positions so as to avoid the fixing part of the support body side connecting part 149 of the first spring member 14x (spring pieces 14a and 14b) to the small projection 192 which is formed at the corner part of the holder 19. The terminals 12x and 12y structured as described above are a metal plate which is performed with punching and bending by using press working or the like and held by the holder 19 in the state where their face directions are directed to the optical axis direction "L", in other words, in the state where their thickness directions are directed in the radial direction.

A through hole 194 through which the outside connecting terminal part 121 is penetrated from the inside to the outside of the holder 19 is formed at a step portion where the bottom wall part 190 and the side wall part 191 are adjacently disposed to each other at a center portion in the circumferential direction of one side face part of the rectangular holder 19. Further, a cut-out part 191c is formed at a position where the inside connecting terminal part 123 is located in the side wall part 191 of the holder 19, i.e., in the side face part adjacent to the side face part where the through hole 194 is formed, so as to interpose the fixing part of the support body side connecting part 149 of the first spring member 14x (spring pieces 14a and 14b) to the small projection 192 of the holder 19 between the through hole 194 and the cut-out part 191c. Specifically, in the corner part of the rectangular holder 19, the elongated connecting part 122 is formed to extend through the outer side of the fixed part of the support body side connecting part 149 of the first spring member 14x to the small projection 192 of the holder 19. The inside connecting terminal part 123 is abutted with the end part of the side wall part 191 of an adjacent side face part, which is adjacent to the side face part where the through hole 194 is formed, in the state where the inside connecting terminal part 123 is entered into the cut-out part 191c. The bottom plate part 190 of the holder 19 is formed with a flat seat part 196 at a portion corresponding to the cut-out part 191c, and the cutting portions 141a of the spring pieces 14a and 14b are placed on the upper faces of the seat parts 196. The seat part 196 is extended to the vicinity of the adjacent side wall part 191, and a slit-shaped groove 195 is formed in the side face part where the through hole 194 is formed between the end part of the seat part 196 and the side wall part 191. Therefore, in the state that the elongated connecting parts 122 of the terminals 12x and 12y are inserted into the grooves 195, the terminals 12x and 12y are fixed to the holder 19. In this embodiment, the outside connecting terminal parts 121 of the terminals 12x and 12y are press-fitted into the through holes 194 of the holder 19, and the elongated connecting parts 122 of the terminals 12x and 12y are press-fitted into the grooves 195 of the holder 19. Therefore, the terminals 12x and 12y are easily and surely fixed to the holder 19.

As described above, when the terminals 12x and 12y are fixed to the holder 19 and the cut-off portions 141a of the spring pieces 14a and 14b are placed on the seat parts 196, the inside connecting terminal parts 123 and the cut-off portions 141a of the spring pieces 14a and 14b are disposed in a posture where their faces are perpendicular to each other. Further, the inside connecting terminal parts 123 and the cut-off portions 141a of the spring pieces 14a and 14b are disposed in the state having a narrow gap space between them in the optical axis direction "L". In this state, a soldering iron is inserted from the outside through the cut-out part 191c, and faces of the inside connecting terminal parts 123 are soldered with faces of the cut-off portions 141a of the spring pieces 14a and 14b.

As described above, in this embodiment, the spring pieces 14a and 14b and the terminals 12x and 12y are separately formed from each other and thus, even when the terminals 12x and 12y are provided with a bent portion, the spring pieces 14a and 14b are not deformed. Further, even when an external force is applied to the outside connecting terminal part 121, the terminals 12x and 12y are provided with the long elongated connecting part 122 and thus the external force is not transmitted to spring portions of the spring pieces 14a and 14b. Therefore, the spring portions of the spring pieces 14a and 14b are surely prevented from being deformed by an external force. Accordingly, variation of spring constant due to deformation of the spring members 14x and 14y are prevented and thus driving of the movable body 3 which utilizes the thrust force by the magnetic drive mechanism 5 and the urging forces of the spring members 14x and 14y is performed satisfactory. In addition, the elongated connecting part 122 is extended along the inner wall of the holder 19 and thus, even when the elongated connecting part 122 is made longer, a malfunction such as contact of the elongated connecting part 122 with the spring pieces 14a and 14b does not occur.

Further, the outside connecting terminal parts 121 of the terminals 12x and 12y are penetrated through the through holes 194 of the holder 19 to be drawn outside. Therefore, since the outside connecting terminal part 121 is drawn outside by utilizing a thick wall portion of the holder 19, the size of the lens drive device 1 is reduced in comparison with a structure that the outside connecting terminal part 121 is drawn outside along the outer face of the holder 19.

In addition, since the outside connecting terminal part 121 is press-fitted into the through hole 194, even when an external force is applied to the outside connecting terminal part 121, the external force is not transmitted to the spring pieces 14a and 14b. Further, since the elongated connecting parts 122 of the terminals 12x and 12y are press-fitted into the grooves 195 formed in a slit-like shape, the elongated connecting parts 122 are fixed firmly. Therefore, even when an external force is applied to the outside connecting terminal part 121, the external force is not transmitted to the spring pieces 14a and 14b. Accordingly, deformation of the spring pieces 14a and 14b are prevented surely.

Further, in this embodiment, the cut-off portions 141a of the spring pieces 14a and 14b are placed on the seat parts 196. Further, the cut-off portion 141a having a wider width than the cut-off portion 141b of the spring pieces 14a and 14b is utilized as a connected part of the terminals 12x and 12y. Therefore, soldering work is easily performed and soldering itself is performed surely.

In addition, the cut-off portions 141a of the spring pieces 14a and 14b and the inside connecting terminal parts 123 of the terminals 12x and 12y are connected with each other so that their faces perpendicular to each other are soldered. Therefore, even when a region where soldering is occupied is narrow on a plane, a sufficiently larger soldering area can be secured on both of the spring pieces 14a and 14b and the terminals 12x and 12y. Further, a gap space in the optical axis direction "L" is secured between the cut-off portions 141a of the spring pieces 14a and 14b and the inside connecting terminal parts 123 of the terminals 12x and 12y, and the gap space is filled with solder. Therefore, a fillet in an appropriate shape can be formed on the soldering portion and the solder does not spread excessively.

The structure that the outside connecting terminal part 121 is press-fitted into the through hole 194 and the elongated connecting part 122 is press-fitted into the groove 195 formed in a slit-like shape may be applied to a structure that the terminals 12x and 12y are formed as a part of the spring members 14x and 14y. Also in this case, an external force which is applied to the outside connecting terminal part 121 is prevented from being transmitted to the spring portions of the spring pieces 14a and 14b because the elongated connecting part 122 which is formed longer is press-fitted into the groove 195.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A lens drive device comprising:
a support body;
a movable body including a lens;
a magnetic drive mechanism for magnetically driving the movable body in a lens optical axis direction; and
a spring member which is connected between the support body and the movable body;
wherein the spring member comprises a plurality of spring pieces which are electrically separated from each other;
the magnetic drive mechanism comprises a coil which is held by the movable body and both end parts of the coil are electrically connected to different spring pieces of the plurality of the spring pieces;
the support body comprises an insulation member;
a plurality of terminals are provided on the insulation member;
the plurality of terminals are separately formed from the spring pieces; and
each of the plurality of the terminals comprises an outside connecting terminal part which is located on an outer side of the insulation member, an inside connecting terminal part which is electrically connected with a connected part of the spring piece, and an elongated connecting part which is extended along an inner wall of the insulation member from the outside connecting terminal part to the inside connecting terminal part.

2. The lens drive device according to claim 1, wherein the insulation member is formed with a through hole through which the outside connecting terminal part is penetrated from an inner side of the insulation member toward its outer side.

3. The lens drive device according to claim 2, wherein the outside connecting terminal part is press-fitted into the through hole.

4. The lens drive device according to claim 3, wherein the insulation member is formed with a groove in a slit-like shape into which at least a part of the elongated connecting part is fitted.

5. The lens drive device according to claim 4, wherein the insulation member is formed with a seat part for supporting the connected part of the spring piece.

6. The lens drive device according to claim 5, wherein
the plurality of the spring pieces is structured by means of that a plate-like member which is connected as one body through connecting parts is separated by cutting the connecting parts, and
the connected part is one of a plurality of cut-off end parts of the spring piece which are formed when the connecting parts are cut off.

7. The lens drive device according to claim 6, wherein the connected part is disposed perpendicularly to the inside connecting terminal part and perpendicular faces of the connected part and the inside connecting terminal part are soldered with each other.

8. The lens drive device according to claim 7, wherein a gap space is formed between the connected part and the inside connecting terminal part in the optical axis direction and the gap space is filled with solder.

9. The lens drive device according to claim 1, wherein the insulation member is formed with a groove in a slit-like shape into which at least a part of the elongated connecting part is fitted.

10. The lens drive device according to claim 9, wherein the insulation member is formed with a seat part for supporting the connected part of the spring piece.

11. The lens drive device according to claim 1, wherein
the plurality of the spring pieces is structured by means of that a plate-like member which is connected as one body through connecting parts is separated by cutting the connecting parts, and
the connected part is one of a plurality of cut-off end parts of the spring piece which are formed when the connecting parts are cut off.

12. The lens drive device according to claim 11, wherein the connected part is a portion having a wider width dimension of the plurality of the cut-off end parts in comparison with other cut-off end part.

13. The lens drive device according to claim 1, wherein the connected part is disposed perpendicularly to the inside connecting terminal part and perpendicular faces of the connected part and the inside connecting terminal part are soldered with each other.

14. The lens drive device according to claim 13, wherein a gap space is formed between the connected part and the inside connecting terminal part in the optical axis direction and the gap space is filled with solder.

15. The lens drive device according to claim 1, wherein
the support body comprises a rectangular holder which is the insulation member on an image element side and a box-shaped yoke and a spacer on an object to be photographed side,
the movable body comprises a sleeve formed in a cylindrical shape,
the spring member comprises a first spring member which is connected between the holder and the sleeve and a second spring member which is connected between the spacer and the sleeve,
the first spring member is divided into two spring pieces, and
a winding start part and a winding end part of the coil are respectively connected to the two spring pieces of the first spring member.

16. The lens drive device according to claim 15, wherein
a through hole through which the outside connecting terminal part is penetrated is formed at a center portion in a circumferential direction of one side face part of the rectangular holder, and
a cut-out part where the inside connecting terminal part is located and a seat part where the connected part of the spring piece is placed are formed on another side face part which is adjacent to the side face part where the through hole is formed.

17. The lens drive device according to claim 16, wherein
the spring piece of the first spring member comprises a support body side connecting part which is held by the holder, a movable body side connecting part which is fixed to the sleeve, and a flat spring-shaped arm part which connects the movable body side connecting part with the support body side connecting part,
the support body side connecting part is fixed to the holder at a corner part of the holder, and
the elongated connecting part of the terminal is extended from the side face part where the through hole is formed to the another side face part adjacent to the side face part where the through hole is formed through the corner part of the holder where the support body side connecting part is fixed.

18. The lens drive device according to claim 17, wherein the holder is formed with a groove in a slit-like shape into which at least a part of the elongated connecting part is fitted.

19. The lens drive device according to claim 17, wherein the connected part is disposed perpendicularly to the inside connecting terminal part and perpendicular faces of the connected part and the inside connecting terminal part are soldered with each other.

20. A lens drive device comprising:
a support body;
a movable body including a lens;
a magnetic drive mechanism for magnetically driving the movable body in a lens optical axis direction; and
a spring member which is connected between the support body and the movable body;
wherein the spring member comprises a plurality of spring pieces which are electrically separated from each other, the magnetic drive mechanism comprises a coil which is held by the movable body, the support body comprises an insulation member which holds a plurality of terminals that are electrically connected with both end parts of the coil; and
wherein each of the plurality of the terminals comprises an outside connecting terminal part which is located on an outer side of the insulation member and an elongated connecting part which is extended along an inner wall of the insulation member from the outside connecting terminal part, and the insulation member is formed with a through hole, through which the outside connecting terminal part is penetrated from inside of the insulation member toward its outside, and a groove formed in a slit-like shape into which at least a part of the elongated connecting part is fitted.

21. The lens drive device according to claim 20, wherein the outside connecting terminal part is press-fitted into the through hole.

* * * * *